United States Patent
Hwang et al.

(10) Patent No.: US 12,464,437 B2
(45) Date of Patent: Nov. 4, 2025

(54) METHOD AND APPARATUS FOR REQUESTING SYSTEM INFORMATION FOR POSITION-BASED SYSTEM IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 17/996,912

(22) PCT Filed: Apr. 21, 2021

(86) PCT No.: PCT/KR2021/005045
§ 371 (c)(1),
(2) Date: Oct. 21, 2022

(87) PCT Pub. No.: WO2021/215831
PCT Pub. Date: Oct. 28, 2021

(65) Prior Publication Data
US 2023/0164673 A1    May 25, 2023

(30) Foreign Application Priority Data
Apr. 22, 2020 (KR) .................... 10-2020-0048867

(51) Int. Cl.
*H04W 48/14* (2009.01)
*H04W 74/0833* (2024.01)

(52) U.S. Cl.
CPC ....... *H04W 48/14* (2013.01); *H04W 74/0833* (2013.01)

(58) Field of Classification Search
CPC ............. H04W 48/14; H04W 74/0833; H04W 64/00; H04W 48/12; H04W 74/004; H04W 48/10
See application file for complete search history.

(56) References Cited

U.S. PATENT DOCUMENTS

| 9,462,606 | B2 | 10/2016 | Won et al. |
| 2020/0120578 | A1 | 4/2020 | Shreevastav et al. |
| 2020/0170020 | A1* | 5/2020 | Agiwal ............... H04W 72/542 |
| 2020/0336891 | A1* | 10/2020 | Guo ........................ H04W 8/20 |
| 2022/0317234 | A1* | 10/2022 | Shreevastav ............ H04W 4/02 |

FOREIGN PATENT DOCUMENTS

| KR | 10-0703287 B1 | 4/2007 |
| WO | 2019/121419 A1 | 6/2019 |

OTHER PUBLICATIONS

Supplementary European Search Report dated Jul. 14, 2023, in connection with European Patent Application No. 21793097.3, 11 pages.

(Continued)

*Primary Examiner* — Mazda Sabouri

(57) ABSTRACT

The present disclosure provides a method, performed by a terminal, of requesting positioning system information, the method including receiving System Information Block 1 (SIB1) from a base station; selecting an uplink type to transmit a message for requesting the positioning system information; identifying configuration information for requesting the positioning system information in the SIB1; selecting a transmission method of the message for requesting the positioning system information, based on the selected uplink type and the identified configuration information; and transmitting the message for requesting the positioning system information, based on the selected uplink type and the selected transmission method.

10 Claims, 7 Drawing Sheets

(56) References Cited

OTHER PUBLICATIONS

Qualcomm Incorporated, "Addition of broadcast of positioning assistance data," R2-1909423, 3GPP TSG-RAN WG2 Meeting #107, Prague, CZ, Aug. 26-30, 2019, 26 pages.
Qualcomm Incorporated, "Broadcast of Location Assistance Data by NG-RAN," R2-1903138, 3GPP TSG-RAN WG2 Meeting #105bis, Xi'an, China, Apr. 8-12, 2019, 7 pages.
ETSI TS 138 321 V15.6.0 (Jul. 2019), Technical Specification, 5G; NR;•Medium Access Control (MAC) protocol specification (3GPP TS 38.321 version 15.6.0 Release 15), Jul. 2019, 80 pages.
Ericsson, "Introduction of on-demand SIB in Connected for Positioning", Change Request, 3GPP TSG-RAN WG2 Meeting #109bis-e, Apr. 20-30, 2020, R2-2003205, 820 pages.
CATT, "RSRP thresholds naming clean-up in MAC", Change Request, 3GPP TSG-RAN WG2#102, May 21-25, 2018, R2-1806997, 8 pages.
Intel Corporation, "Support of on demand SI for broadcast of assistance data", 3GPP TSG RAN WG2 Meeting #106, May 13-17, 2019, R2-1906361, 6 pages.
International Search Report and Written Opinion of the International Searching Authority dated Jul. 29, 2021 in connection with International Patent Application No. PCT/KR2021/005045, 7 pages.
Communication Pursuant to Article 94(3) EPC dated May 26, 2025, in connection with European Application No. 21793097.3, 6 pages.
Office Action dated Aug. 31, 2025, in connection with Korean Application No. 10-2020-0048867, 8 pages.
3rd Generation Partnership Project; Technical Specification Group Radio Access Network; NR; Medium Access Control (MAC) protocol specification (Release 15), 3GPP TS 38.321, V15.6.0, Jun. 2019, 76 pages.

\* cited by examiner

METHOD AND APPARATUS FOR REQUESTING SYSTEM INFORMATION FOR POSITION-BASED SYSTEM IN WIRELESS COMMUNICATION SYSTEM

CROSS-REFERENCE TO RELATED APPLICATIONS

This application is a 371 National Stage of International Application No. PCT/KR2021/005045, filed Apr. 21, 2021, which claims priority to Korean Patent Application No. 10-2020-0048867, filed Apr. 22, 2020, the disclosures of which are herein incorporated by reference in their entirety.

BACKGROUND

1. Field

The present disclosure relates to a method of requesting system information in a wireless communication system, and more particularly, to a method and apparatus for requesting system information for a position-based system in a wireless communication system.

2. Description of Related Art

To meet the increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high-frequency band for 5G communication systems, various technologies such as beamforming, massive multiple-input multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and receiving interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technologies including beamforming, MIMO, array antennas, and the like. Application of a cloud RAN as the above-described big data processing technology may be an example of convergence of 5G communication technology and IoT technology.

As various services can be provided according to the above features and the development of mobile communication systems, a scheme for effectively providing such services is being required and particularly, various methods for efficiently requesting information about the position of a terminal are being required.

SUMMARY

Disclosed embodiments provide an apparatus and method capable of effectively providing a service in a mobile communication system.

Described embodiments provide a method of requesting system information for a position-based system in a mobile communication system.

Described embodiments may provide an apparatus and method capable of effectively providing a service in a wireless communication system.

DETAILED DESCRIPTION

Figure 1:
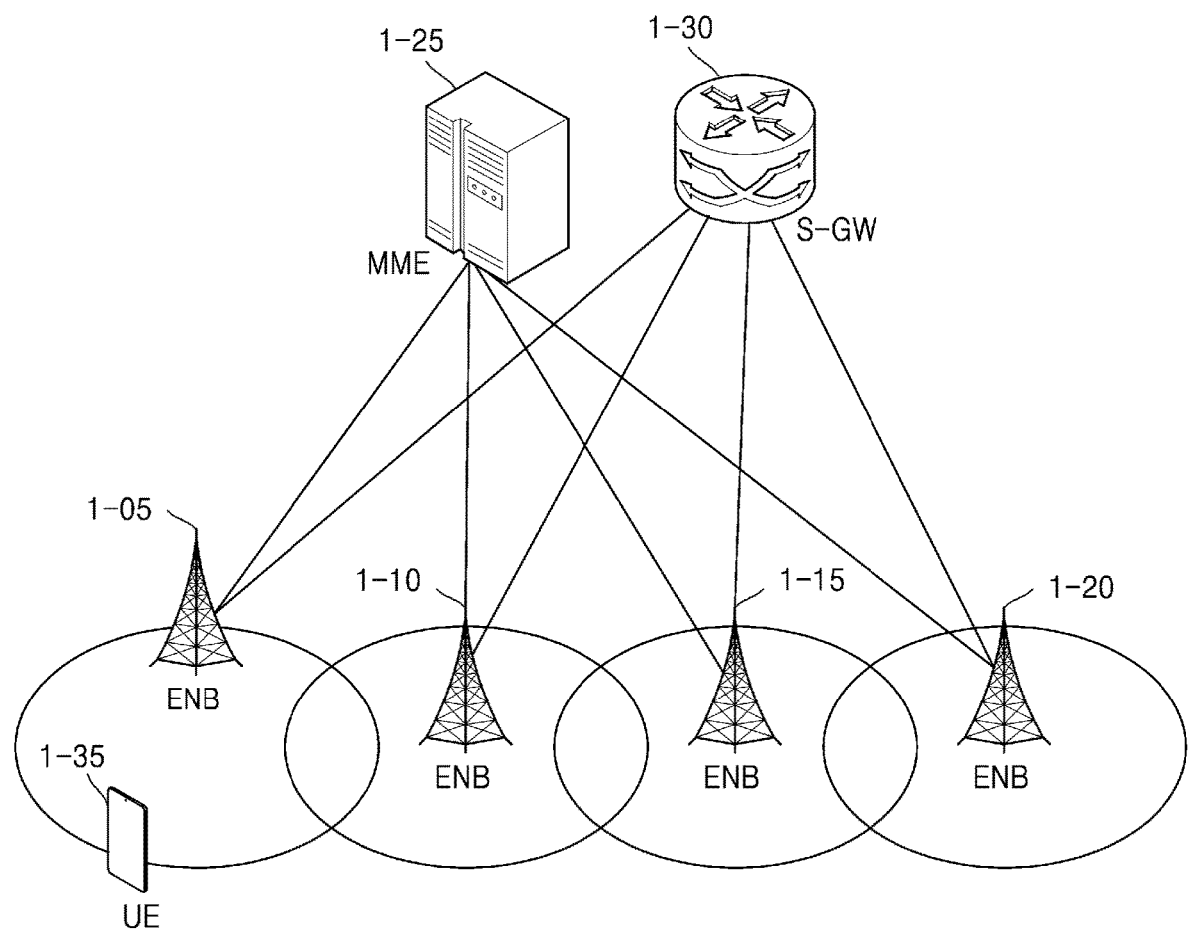
FIG. 1 is a diagram illustrating a structure of an LTE system according to an embodiment of the present disclosure.

According to an embodiment of the present disclosure, a method, performed by a terminal, of requesting positioning system information includes receiving System Information Block 1 (SIB1) from a base station, selecting an uplink type to transmit a message for requesting the positioning system information, identifying configuration information for requesting the positioning system information in the SIB1, selecting a transmission method of the message for requesting the positioning system information, based on the selected uplink type and the identified configuration information, and transmitting the message for requesting the positioning system information, based on the selected uplink type and the selected transmission method.

The uplink type may include a normal uplink (NUL) and a supplementary uplink (SUL), the transmission method may include a transmission method through Msg 1 and a transmission method through Msg 3, and the configuration information for requesting the positioning system information included in the SIB1 may include at least one of configuration information for requesting the positioning system information in the SUL and configuration information for requesting the positioning system information in the NUL.

Selecting the uplink type to transmit the message for requesting the positioning system information may include selecting the SUL or the NUL based on a predetermined RSRP threshold condition.

Selecting the transmission method of the message for requesting the positioning system information, based on the selected uplink type and the identified configuration information may include, when the configuration information for requesting the positioning system information in the SUL is included in the SIB1, and the SUL is selected based on the predetermined RSRP threshold condition, or when the configuration information for requesting the positioning system information in the NUL is included in the SIB1 and the NUL is selected based on the predetermined RSRP threshold condition, selecting the transmission method through the Msg 1.

The transmitting may include, when the transmission method through the Msg 1 is selected, transmitting the Msg 1 based on a resource and a preamble determined based on the configuration information for requesting the positioning system information in the SUL or the configuration information for requesting the positioning system information in the NUL.

Selecting the transmission method of the message for requesting the positioning system information, based on the selected uplink type and the identified configuration information may include, when the configuration information for requesting the positioning system information in the SUL is included in the SIB1 and the NUL is selected based on the predetermined RSRP threshold condition, or when the configuration information for requesting the positioning system information in the NUL is included in the SIB1 and the SUL is selected based on the predetermined RSRP threshold condition, selecting the transmission method through the Msg 3.

When the transmission method through the Msg 3 is selected, the Msg 3 may include an indicator indicating a message for requesting the positioning system information.

When the SUL is selected as the uplink type to transmit the message for requesting the positioning system information, the terminal may transmit the message for requesting the positioning system information by using a power control parameter of the SUL, and when the NUL is selected as the uplink type to transmit the message for requesting the positioning system information, the terminal may transmit the message for requesting the positioning system information by using a power control parameter of the NUL.

The configuration information for requesting the positioning system information may be included in PosSI-SchedulingInfoList in the SIB1.

The SIB1 may further include configuration information for requesting normal system information, and the transmitting may include, when a rach-OccasionsSI field is not included in the configuration information for requesting the positioning system information, transmitting the message for requesting the positioning system information based on the configuration information for requesting the normal system information.

According to an embodiment of the present disclosure, a terminal for requesting positioning system information includes a transceiver, and a controller coupled with the transceiver and configured to receive System Information Block 1 (SIB1) from a base station, select an uplink type to transmit a message for requesting the positioning system information, identify configuration information for requesting the positioning system information in the SIB1, select a transmission method of the message for requesting the positioning system information, based on the selected uplink type and the identified configuration information, and transmit the message for requesting the positioning system information, based on the selected uplink type and the selected transmission method.

The uplink type may include a normal uplink (NUL) and a supplementary uplink (SUL), the transmission method may include a transmission method through Msg 1 and a transmission method through Msg 3, and the configuration information for requesting the positioning system information included in the SIB1 may include at least one of configuration information for requesting the positioning system information in the SUL and configuration information for requesting the positioning system information in the NUL.

The processor may be configured to select the SUL or the NUL based on a predetermined RSRP threshold condition.

The processor may be configured to, when the configuration information for requesting the positioning system information in the SUL is included in the SIB1, and the SUL is selected based on the predetermined RSRP threshold condition, or when the configuration information for requesting the positioning system information in the NUL is included in the SIB1 and the NUL is selected based on the predetermined RSRP threshold condition, select the transmission method through the Msg 1.

The processor may be configured to, when the configuration information for requesting the positioning system information in the SUL is included in the SIB1 and the NUL is selected based on the predetermined RSRP threshold condition, or when the configuration information for requesting the positioning system information in the NUL is included in the SIB1 and the SUL is selected based on the predetermined RSRP threshold condition, select the transmission method through the Msg 3.

Hereinafter, embodiments of the present disclosure will be described in detail with reference to the accompanying drawings. In the following description of the present disclosure, detailed descriptions of well-known functions or configurations will be omitted because they would unnecessarily obscure the subject matters of the present disclosure. Also, terms described below may be terms defined considering functions in the present disclosure and may vary according to users' or operators' intentions or practices. Therefore, the definition thereof should be made based on the content throughout the specification.

In the following description, terms for identifying access nodes, terms referring to network entities, terms referring to messages, terms referring to interfaces between network entities, terms referring to various identification information, and the like are used for convenience of descriptions. Thus, the present disclosure is not limited to the terms described below and other terms referring to objects having equivalent technical meanings may be used.

In the following description, terms and names defined in the 3rd Generation Partnership Project Long Term Evolution (3GPP LTE) standards may be used for convenience of description. However, the present disclosure is not limited to such terms and names and may be similarly applied to systems according to other standards.

Advantages and features of the present disclosure and methods of achieving the same will be apparent from the embodiments of the present disclosure described below in detail with reference to the accompanying drawings. The present disclosure may, however, be embodied in many different forms and should not be construed as being limited to the embodiments of the present disclosure described below; rather, these embodiments of the present disclosure are provided to complete the present disclosure and fully convey the scope of the present disclosure to those of ordinary skill in the art and the present disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be directed to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "unit" used in the present embodiments may refer to a software component or a hardware component such as a field programmable gate array (FPGA) or an application specific integrated circuit (ASIC) and the "unit" may perform certain functions. However, the "unit" is not limited to software or hardware. The "unit" may be configured to be in an addressable storage medium or may be configured to operate one or more processors. Thus, as an example, the "unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "units" may be associated with the smaller number of components and "units" or may be further divided into additional components and "units". In addition, the components and "units" may be implemented to operate one or more central processing units (CPUs) in a device or a security multimedia card. Also, in embodiments, the "unit" may include one or more processors.

In the following description of the present disclosure, detailed descriptions of well-known functions or configurations will be omitted because they would unnecessarily obscure the subject matters of the present disclosure. Hereinafter, embodiments of the present disclosure will be described with reference to the accompanying drawings.

In the following description, terms for identifying access nodes, terms referring to network entities, terms referring to messages, terms referring to interfaces between network entities, terms referring to various identification information, and the like are used for convenience of descriptions. Thus, the present disclosure is not limited to the terms used below and other terms referring to objects having equivalent technical meanings may be used. For example, in the following description, a "terminal" may refer to a MAC entity in a terminal that exists for each master cell group (MCG) and secondary cell group (SCG) described below.

In the following description, terms and names defined in the 3rd Generation Partnership Project Long Term Evolution (3GPP LTE) standards may be used for convenience of description. However, the present disclosure is not limited to those terms and names and may be equally applied to systems according to other standards.

Hereinafter, a base station may be an agent performing terminal resource allocation and may be at least one of a gNode B, an eNode B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. However, the present disclosure is not limited thereto.

Particularly, the present disclosure may be applied to 3GPP NR (5G mobile communication standards). Also, the present disclosure may be applied to intelligent services (e.g., smart home, smart building, smart city, smart car or connected car, health care, digital education, retail business, security, and safety-related services) based on 5G communication technology and IoT technology. In the present disclosure, eNB may be interchangeably used with gNB for convenience of descriptions. That is, a base station described as an eNB may represent a gNB. Also, the term "terminal"

may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to an embodiment, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved multiple-input multiple-output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km2) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMIBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the present disclosure is applied are not limited thereto.

Also, although embodiments of the present disclosure will be described below by using an LTE, LTE-A, LTE Pro, or 5G (or NR, next-generation mobile communication) as an example, the embodiments of the present disclosure may also be applied to other communication systems having similar technical backgrounds or channel types. Also, the embodiments of the present disclosure may also be applied to other communication systems through some modifications without departing from the scope of the present disclosure by the judgment of those of ordinary skill in the art.

The present disclosure relates to a technology by which, when a terminal measures a signal transmitted from a base station and transmits the measured signal to a position management server of a core network, the position management server detects the position of the terminal based on the received signal. Various assistance information may be required depending on position measurement methods, and the present disclosure may propose a method of requesting the base station to provide assistance information necessary for a position measurement method through system information.

Also, according to an embodiment of the present disclosure, when the terminal requests the base station or the network to provide assistance information for positioning purposes through system information, the base station or the network may indicate to the terminal whether to use a supplementary uplink (SUL) or whether to use a normal uplink (NUL). Also, when the terminal transmits a signal for requesting to provide positioning-purpose assistance information through system information, si request configuration information for positioning may be defined differently from normal si request configuration information to be used for positioning.

That is, according to an embodiment of the present disclosure, a method by which the terminal requests system information for positioning may be provided.

FIG. 1 is a diagram illustrating a structure of an LTE system according to an embodiment of the present disclosure.

Referring to FIG. 1, as illustrated, a radio access network of the LTE system may include next-generation base stations (e.g., evolved Node Bs (eNBs), Node Bs, or base stations) 1-05, 1-10, 1-15, and 1-20, a mobility management entity (MME) 1-25, and a serving-gateway (S-GW) 1-30. A user terminal (e.g., a user equipment (UE) or a terminal) 1-35 may access an external network through the eNBs 1-05 to 1-20 and the S-GW 1-30.

In FIG. 1, the eNBs 1-05 to 1-20 may correspond to the existing Node Bs of a UMTS system. The eNB may be connected to the UE 1-35 through a radio channel and may perform a more complex function than the existing Node B. In the LTE system, all user traffic including real-time services such as Voice over IP (VoIP) through the Internet protocol may be serviced on a shared channel. Thus, a device for collecting and scheduling state information such as the buffer states of UEs, available transmission power states, and channel states may be required, which may be performed by the eNBs 1-05 to 1-20. One eNB may generally control a plurality of cells. For example, in order to implement a transmission rate of 100 Mbps, the LTE system may use Orthogonal Frequency Division Multiplexing (OFDM) as a radio access technology in a 20 MHz bandwidth. Also, an adaptive modulation & coding (AMC) scheme may be applied to determine a modulation scheme and a channel coding rate according to the channel state of a terminal. The S-GW 1-30 may be a device for providing a data bearer and may generate or remove a data bearer under the control by the MME 1-25. The MME may be a device for performing various control functions as well as a mobility management function for a terminal and may be connected to a plurality of base stations.

Figure 2:
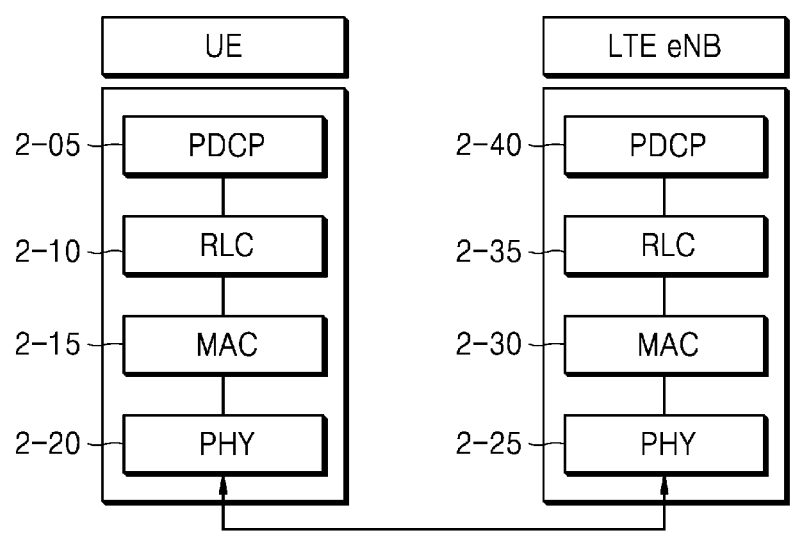
FIG. 2 is a diagram illustrating a radio protocol architecture of an LTE system according to an embodiment of the present disclosure.

FIG. 2 is a diagram illustrating a radio protocol architecture of an LTE system according to an embodiment of the present disclosure.

Referring to FIG. 2, the radio protocol of the LTE system may include Packet Data Convergence Protocol (PDCP) 2-05 and 2-40, Radio Link Control (RLC) 2-10 and 2-35, Medium Access Control (MAC) 2-15 and 2-30, and physical (PHY) devices (or layers) in each of a terminal and an eNB. However, the present disclosure is not limited to the above example and it may include fewer or more devices than the above example.

According to an embodiment of the present disclosure, the PDCP may perform operations such as IP header compression/decompression. The main functions of the PDCP may be summarized as follows. However, the present disclosure is not limited to the following example.

Header compression and decompression function (Header compression and decompression: RObust Header Compression (ROHC) only)
 User data transmission function (Transfer of user data)
 Sequential transmission function (In-sequence delivery of upper layer PDUs at PDCP re-establishment procedure for RLC Acknowledged Mode (AM))
 Reordering function (For split bearers in DC (only support for RLC AM): PDCP PDU routing for transmission and PDCP PDU reordering for reception)
 Duplicate detection function (Duplicate detection of lower layer SDUs at PDCP re-establishment procedure for RLC AM)
 Retransmission function (Retransmission of PDCP SDUs at handover and, for split bearers in DC, of PDCP PDUs at PDCP data-recovery procedure, for RLC AM)
 Ciphering and deciphering function (Ciphering and deciphering)
 Timer-based SDU discard function (Timer-based SDU discard in uplink)

According to an embodiment of the present disclosure, the RLC 2-10 and 2-35 may reconfigure a PDCP packet data unit (PDU) in a suitable size to perform an ARQ operation or the like. The main functions of the RLC may be summarized as follows. However, the present disclosure is not limited to the following example.

Data transmission function (Transfer of upper layer PDUs)
 ARQ function (Error Correction through ARQ (only for AM data transfer))
 Concatenation, segmentation, and reassembly function (Concatenation, segmentation, and reassembly of RLC SDUs (only for UM and AM data transfer))
 Re-segmentation function (Re-segmentation of RLC data PDUs (only for AM data transfer))
 Reordering function (Reordering of RLC data PDUs (only for UM and AM data transfer))
 Duplicate detection function (Duplicate detection (only for UM and AM data transfer))
 Error detection function (Protocol error detection (only for AM data transfer))
 RLC SDU discard function (RLC SDU discard (only for UM and AM data transfer))
 RLC re-establishment function (RLC re-establishment)

According to an embodiment of the present disclosure, the MAC 2-15 and 2-30 may be connected to several RLC entities configured in one terminal and may perform an operation of multiplexing RLC PDUs into MAC PDUs and demultiplexing RLC PDUs from MAC PDUs. The main functions of the MAC may be summarized as follows. However, the present disclosure is not limited to the following example.

Mapping function (Mapping between logical channels and transport channels)
 Multiplexing and demultiplexing function (Multiplexing/demultiplexing of MAC SDUs belonging to one or different logical channels into/from transport blocks (TB) delivered to/from the physical layer on transport channels)
 Scheduling information report function (Scheduling information reporting)
 HARQ function (Error correction through HARQ)
 Priority handling function between logical channels (Priority handling between logical channels of one UE)
 Priority handling function between terminals (Priority handling between UEs by means of dynamic scheduling)
 MBMS service identification function (MBMS service identification)
 Transport format selection function (Transport format selection)
 Padding function (Padding)

According to an embodiment of the present disclosure, physical layers 2-20 and 2-25 may channel-code and modulate upper layer data, generate OFDM symbols, and transmit the same through radio channels or may demodulate and channel-decode OFDM symbols received through radio channels and transmit the result thereof to the upper layer.

Figure 3:
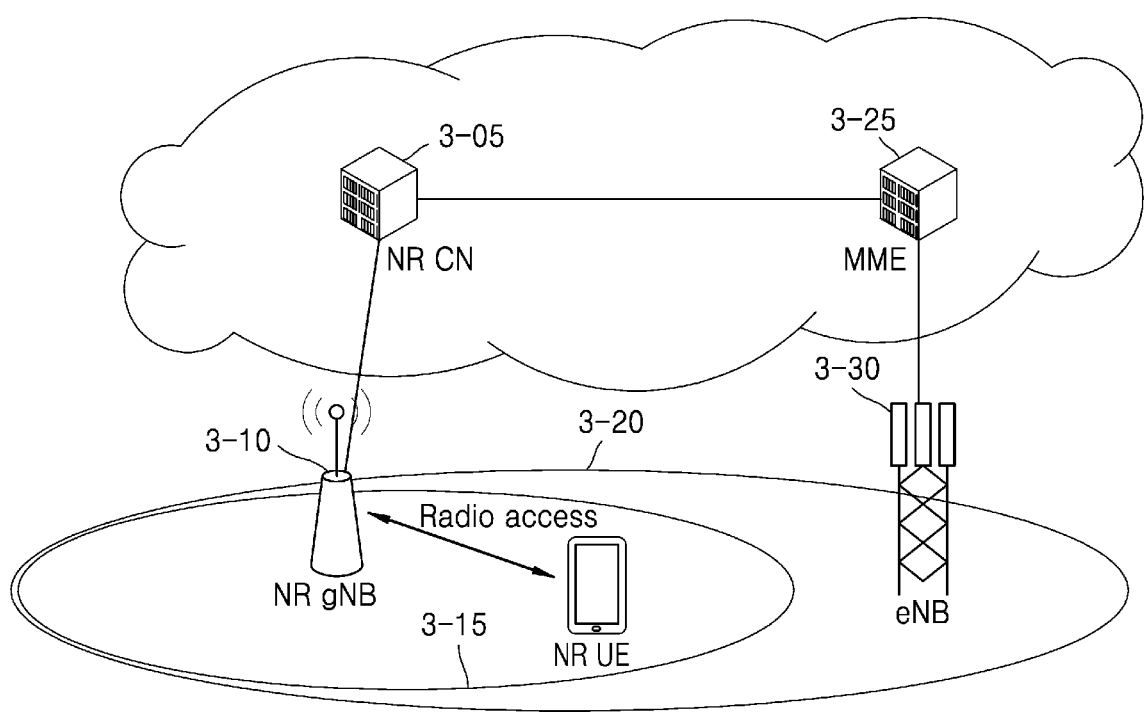
FIG. 3 is a diagram illustrating a structure of a next-generation mobile communication system according to an embodiment of the present disclosure.

FIG. 3 is a diagram illustrating a structure of a next-generation mobile communication system according to an embodiment of the present disclosure.

Referring to FIG. 1C, a radio access network of the next-generation mobile communication system (hereinafter NR or 2g) may include a next-generation base station (New Radio Node B) (hereinafter NR gNB or NR base station) 3-10 and a next-generation radio core network (New Radio Core (NR CN)) 3-05. A next-generation radio user terminal (new radio user equipment (NR UE) or terminal) 3-15 may access an external network through the NR gNB 3-10 and the NR CN 3-05.

In FIG. 3, the NR gNB 3-10 may correspond to an evolved Node B (eNB) of the existing LTE system. The NR gNB 3-10 may be connected to the NR UE 3-15 through a radio channel and may provide a better service than the existing Node B. In the next-generation mobile communication system, all user traffic may be serviced on a shared channel. Thus, a device for collecting and scheduling state information such as the buffer states of UEs, available transmission power states, and channel states may be required, which may be performed by the NR NB 3-10. One NR gNB 3-10 may control a plurality of cells. In the next-generation mobile communication system, a bandwidth larger than or equal to the current maximum bandwidth may be applied to implement ultra-high-speed data transmission compared to the current LTE. Also, Orthogonal Frequency Division Multiplexing (OFDM) may be used as a radio access technology, and a beamforming technology may be additionally used.

Also, according to an embodiment of the present disclosure, the NR gNB 3-10 may apply an adaptive modulation & coding (AMC) scheme to determine a modulation scheme and a channel coding rate according to the channel state of a terminal. The NR CN 3-05 may perform functions such as mobility support, bearer configuration, and Quality of Service (QoS) configuration. The NR CN 3-05 may be a device for performing various control functions as well as a mobility management function for a terminal and may be connected to a plurality of base stations. Also, the next-generation mobile communication system may also be linked with the existing LTE system, and the NR CN 3-05 may be connected to an MME 3-25 through a network interface. The MME may be connected to an eNB 3-30 that is an existing base station.

Figure 4:
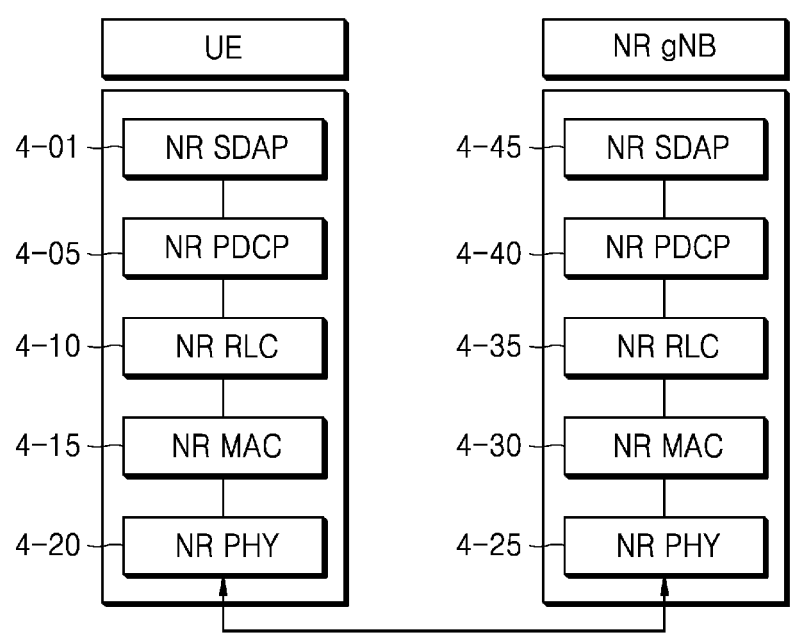
FIG. 4 is a diagram illustrating a radio protocol architecture of a next-generation mobile communication system according to an embodiment of the present disclosure.

FIG. 4 is a diagram illustrating a radio protocol architecture of a next-generation mobile communication system according to an embodiment of the present disclosure.

Referring to FIG. 4, the radio protocol of the next-generation mobile communication system may include NR Service Data Adaptation Protocol (SDAP) 4-01 and 4-45, NR PDCP 4-05 and 4-40, NR RLC 4-10 and 4-35, NR MAC 4-15 and 4-30, and NR PHY devices (or layers) 4-20 and 4-25 in each of a terminal and an NR base station.

According to an embodiment of the disclosure, the main functions of the NR SDAP 4-01 and 4-45 may include some of the following functions.

User data transmission function (Transfer of user plane data)
Function of mapping between QoS flow and data bearer for uplink and downlink (Mapping between a QoS flow and a DRB for both DL and UL)
Function of marking QoS flow ID for uplink and downlink (Marking QoS flow ID in both DL and UL packets)
Function of mapping reflective QoS flow to data bearer for uplink SDAP PDUs (Reflective QoS flow to DRB mapping for the UL SDAP PDUs)

As for an SDAP entity, the terminal may be configured with a Radio Resource Control (RRC) message for each PDCP entity, for each bearer, or for each logical channel whether to use a header of the SDAP entity or whether to use a function of the SDAP entity. When an SDAP header is configured, a 1-bit non-access stratum (NAS) Quality of Service (QoS) reflection configuration indicator (NAS reflective QoS) and a 1-bit access stratum (AS) QoS reflection configuration indicator (AS reflective QoS) of the SDAP header may indicate the terminal to update or reconfigure mapping information between a QoS flow and a data bearer for the uplink and the downlink. The SDAP header may include QoS flow ID information representing the QoS. The QoS information may be used as data processing priority and scheduling information or the like to support a smooth service.

According to an embodiment of the present disclosure, the main functions of the NR PDCP 4-05 and 4-40 may include some of the following functions. However, the present disclosure is not limited to the following example.

Header compression and decompression function (Header compression and decompression: ROHC only)
User data transmission function (Transfer of user data)
Sequential transmission function (In-sequence delivery of upper layer PDUs)
Non-sequential transmission function (Out-of-sequence delivery of upper layer PDUs)
Reordering function (PDCP PDU reordering for reception)
Duplicate detection function (Duplicate detection of lower layer SDUs)
Retransmission function (Retransmission of PDCP SDUs)
Ciphering and deciphering function (Ciphering and deciphering)
Timer-based SDU discard function (Timer-based SDU discard in uplink)

In the above description, the reordering function of the NR PDCP entity may mean a function of reordering the PDCP PDUs received from the lower layer in order based on a PDCP sequence number (SN). The reordering function of the NR PDCP entity may include a function of transmitting data to the upper layer in the reordered order, may include a function of directly transmitting data without considering the order, may include a function of rearranging the order and recording the missing PDCP PDUs, may include a function of reporting the state of the missing PDCP PDUs to the transmitting side, and may include a function of requesting retransmission of the missing PDCP PDUs.

According to an embodiment of the present disclosure, the main functions of the NR RLC 4-10 and 4-35 may include some of the following functions. However, the present disclosure is not limited to the following example.

Data transmission function (Transfer of upper layer PDUs)
Sequential transmission function (In-sequence delivery of upper layer PDUs)
Non-sequential transmission function (Out-of-sequence delivery of upper layer PDUs)
ARQ function (Error correction through ARQ)
Concatenation, segmentation, and reassembly function (Concatenation, segmentation, and reassembly of RLC SDUs)
Re-segmentation function (Re-segmentation of RLC data PDUs)
Reordering function (Reordering of RLC data PDUs)
Duplicate detection function (Duplicate detection)

Error detection function (Protocol error detection)
RLC SDU discard function (RLC SDU discard)
RLC re-establishment function (RLC re-establishment)

In the above description, the sequential transmission (in-sequence delivery) function of the NR RLC entity may mean a function of sequentially transmitting the RLC SDUs received from the lower layer to the upper layer. When one original RLC SDU is divided into multiple RLC SDUs and then received, the sequential transmission (in-sequence delivery) function of the NR RLC entity may include a function of reassembling and then transmitting the same.

The sequential transmission (in-sequence delivery) function of the NR RLC entity may include a function of rearranging the received RLC PDUs based on the RLC sequence number (SN) or the sequence number (SN), may include a function of rearranging the order and recording the missing RLC PDUs, may include a function of reporting the state of the missing RLC PDUs to the transmitting side, and may include a function of requesting retransmission of the missing RLC PDUs.

The sequential transmission (in-sequence delivery) function of the NR RLC entity may include a function of sequentially transmitting, when there is a missing RLC SDU, only the RLC SDUs up to before the missing RLC SDU to the upper layer.

The sequential transmission (in-sequence delivery) function of the NR RLC entity may include a function of sequentially transmitting all RLC SDUs received before the start of a timer to the upper layer, when a predetermined timer has expired even when there is a missing RLC SDU.

The sequential transmission (in-sequence delivery) function of the NR RLC entity may include a function of sequentially transmitting all RLC SDUs received up to now to the upper layer, when a predetermined timer has expired even when there is a missing RLC SDU.

The NR RLC entity may process the RLC PDUs in the order of reception regardless of the sequence number (out-of-sequence delivery) and transmit the same to the NR PDCP entity.

In the case of receiving segments, the NR RLC entity may receive segments stored in a buffer or to be received, reconfigure the segments into a single RLC PDU, and then transmit the same to the NR PDCP entity.

The NR RLC layer may not include the concatenation function, and this function may be performed in the NR MAC layer or may be replaced with the multiplexing function of the NR MAC layer.

In the above description, the non-sequential transmission (out-of-sequence delivery) function of the NR RLC entity may mean a function of directly transmitting the RLC SDUs received from the lower layer to the upper layer regardless of the order thereof. When one original RLC SDU is divided into multiple RLC SDUs and then received, the non-sequential transmission (out-of-sequence delivery) function of the NR RLC entity may include a function of reassembling and then transmitting the same. The non-sequential transmission (out-of-sequence delivery) function of the NR RLC entity may include a function of storing the RLC SN or PDCP SN of the received RLC PDUs, arranging the order thereof, and recording the missing RLC PDUs.

According to an embodiment of the present disclosure, the NR MAC 4-15 and 4-30 may be connected to multiple NR RLC entities configured in one terminal, and the main functions of the NR MAC may include some of the following functions. However, the present disclosure is not limited to the following example.

Mapping function (Mapping between logical channels and transport channels)
Multiplexing and demultiplexing function (Multiplexing/demultiplexing of MAC SDUs)
Scheduling information report function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

According to an embodiment of the present disclosure, the NR PHY layers 4-20 and 4-25 may channel-code and modulate upper layer data, generate OFDM symbols, and transmit the same on radio channels or may demodulate and channel-decode OFDM symbols received on radio channels and transmit the results thereof to the upper layer. However, the present disclosure is not limited to the following example.

Figure 5:
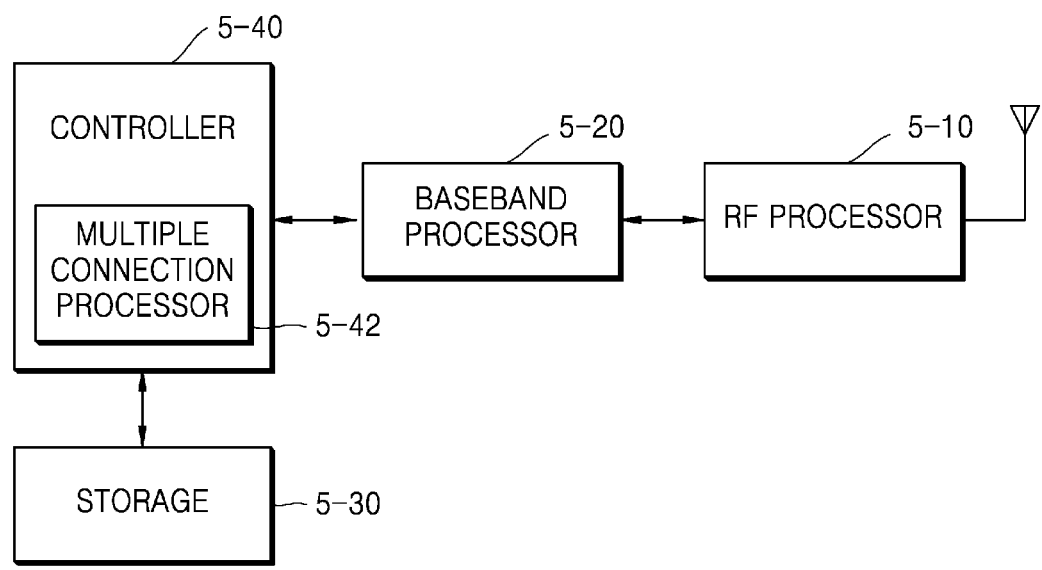
FIG. 5 is a block diagram illustrating an internal structure of a terminal according to an embodiment of the present disclosure.

FIG. 5 is a block diagram illustrating a structure of a terminal according to the present disclosure.

Referring to FIG. 5, the terminal may include a radio frequency (RF) processor 5-10, a baseband processor 5-20, a storage 5-30, and a controller 5-40. Also, the controller 5-40 may further include a multiple connection processor 5-42. However, the present disclosure is not limited thereto, and the terminal may include fewer or more components than the components illustrated in FIG. 5.

The RF processor 5-10 may perform functions for transmitting/receiving signals on radio channels, such as band conversion and amplification of signals. That is, the RF processor 5-10 may up-convert a baseband signal provided from the baseband processor 5-20 into an RF band signal and transmit the same through an antenna and may down-convert an RF band signal received through the antenna into a baseband signal. For example, the RF processor 5-10 may include a transmission filter, a reception filter, an amplifier, a mixer, an oscillator, a digital-to-analog converter (DAC), and an analog-to-digital converter (ADC).

Although only one antenna is illustrated in FIG. 5, the terminal may include a plurality of antennas. Also, the RF processor 5-10 may include a plurality of RF chains. In addition, the RF processor 5-10 may perform beamforming. For beamforming, the RF processor 5-10 may adjust the phase and magnitude of each of the signals transmitted or received through a plurality of antennas or antenna elements. Also, the RF processor 5-10 may perform multiple-input multiple-output (MIMO) and may receive multiple layers when performing a MIMO operation.

The baseband processor 5-20 may perform a conversion function between a baseband signal and a bit string according to the physical layer standard of the system. For example, during data transmission, the baseband processor 5-20 may generate complex symbols by encoding and modulating a transmission bit string. Also, during data reception, the baseband processor 5-20 may restore a reception bit string by demodulating and decoding the baseband signal provided from the RF processor 5-10. For example, according to an OFDM scheme, during data transmission, the baseband processor 5-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor 5-20 may divide the baseband signal provided from the RF processor 5-10 into OFDM symbol units, restore signals mapped to the subcarriers through a fast Fourier transform (FFT) operation, and then restore a reception bit string through demodulation and decoding.

The baseband processor 5-20 and the RF processor 5-10 may transmit and receive signals as described above. Accordingly, the baseband processor 5-20 and the RF processor 5-10 may be referred to as a transmitter, a receiver, a transceiver, or a communicator. In addition, at least one of the baseband processor 5-20 and the RF processor 5-10 may include a plurality of communication modules to support a plurality of different radio access technologies. Also, at least one of the baseband processor 5-20 and the RF processor 5-10 may include a plurality of communication modules to process signals of different frequency bands. For example, the different radio access technologies may include wireless LAN (e.g., IEEE 802.11) and cellular network (e.g., LTE). Also, the different frequency bands may include a super high frequency (SHF) (e.g., 2.NR Hz or NR Hz) band and a millimeter wave (e.g., 60 GHz) band. The terminal may transmit/receive signals to/from the base station by using the baseband processor 5-20 and the RF processor 5-10, and the signals may include control information and data.

The storage 5-30 may store data such as a basic program, an application program, or configuration information for an operation of the terminal. Particularly, the storage 5-30 may store information related to a second access node performing wireless communication by using a second radio access technology. Also, the storage 5-30 may provide the stored data at the request of the controller 5-40. The storage 5-30 may include a storage medium or a combination of storage media such as ROM, RAM, hard disk, CD-ROM, and DVD. Also, the storage 5-30 may include a plurality of memories.

The controller 5-40 may control overall operations of the terminal. For example, the controller 5-40 may transmit/receive signals through the baseband processor 5-20 and the RF processor 5-10. Also, the controller 5-40 may write/read data into/from the storage 5-40. For this purpose, the controller 5-40 may include at least one processor. For example, the controller 5-40 may include a communication processor (CP) for performing control for communication and an application processor (AP) for controlling an upper layer such as an application program. According to an embodiment of the present disclosure, the controller 5-40 may include a multiple connection processor 5-42 configured to process a process operating in a multiple-connection mode. Also, at least one component in the terminal may be implemented as one chip.

According to an embodiment of the present disclosure, the controller 5-40 may control each component of the terminal to perform a method of requesting system information for a position-based system according to an embodiment of the present disclosure. The method of requesting system information for a position-based system according to the present disclosure will be described below in detail with reference to FIG. 7.

Figure 6:
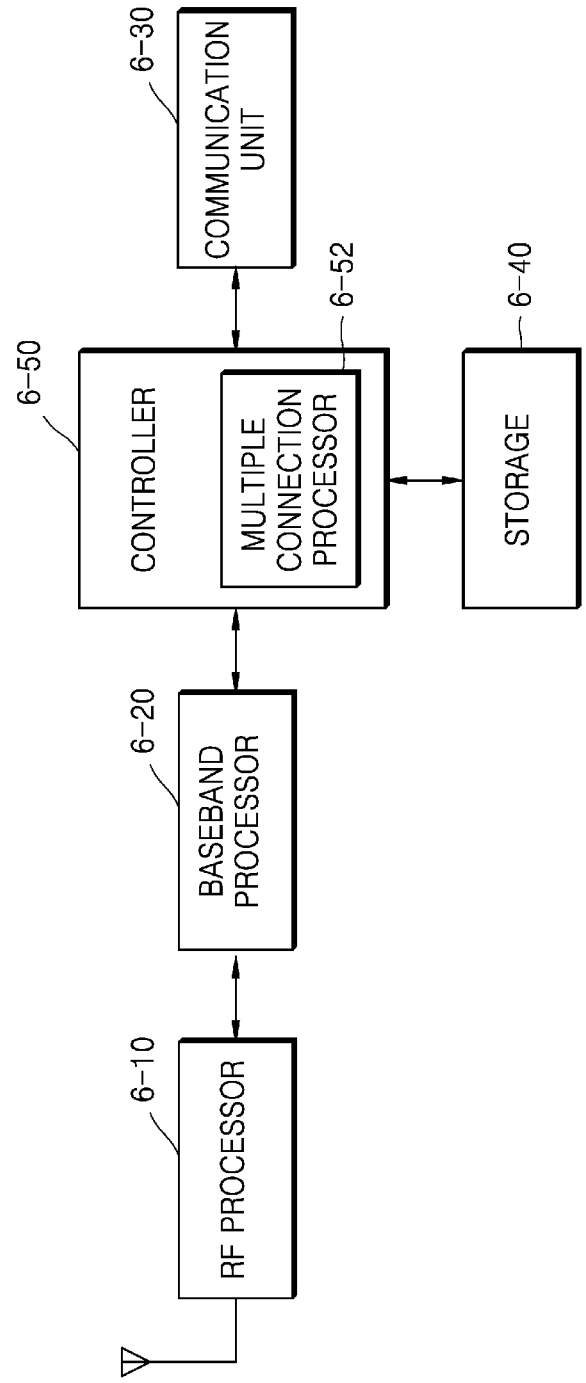
FIG. 6 is a block diagram illustrating a configuration of an NR base station according to an embodiment of the present disclosure.

FIG. 6 is a block diagram illustrating a configuration of an NR base station according to an embodiment of the present disclosure.

As illustrated in FIG. 6, the base station may include an RF processor 6-10, a baseband processor 6-20, a backhaul communicator 6-30, a storage 6-40, and a controller 6-50. Also, the controller 6-50 may further include a multiple connection processor 6-52. However, the present disclosure is not limited thereto, and the base station may include fewer or more components than the components illustrated in FIG. 6.

The RF processor 6-10 may perform functions for transmitting or receiving signals through radio channels, such as band conversion and amplification of signals. That is, the RF processor 6-10 may up-convert a baseband signal provided from the baseband processor 6-20 into an RF band signal and transmit the same through an antenna and may down-convert an RF band signal received through the antenna into a baseband signal. For example, the RF processor 6-10 may include a transmission filter, a reception filter, an amplifier, a mixer, an oscillator, a DAC, and an ADC.

Although only one antenna is illustrated in FIG. 6, the base station may include a plurality of antennas. Also, the RF processor 6-10 may include a plurality of RF chains. In addition, the RF processor 6-10 may perform beamforming. For beamforming, the RF processor 6-10 may adjust the phase and magnitude of each of the signals transmitted/received through a plurality of antennas or antenna elements. The RF processor 6-10 may perform a downlink MIMO operation by transmitting one or more layers.

The baseband processor 6-20 may perform a conversion function between a baseband signal and a bit string according to the physical layer standard of a first radio access technology. For example, during data transmission, the baseband processor 6-20 may generate complex symbols by encoding and modulating a transmission bit string. Also, during data reception, the baseband processor 6-20 may restore a reception bit string by demodulating and decoding the baseband signal provided from the RF processor 6-10.

For example, according to the OFDM scheme, during data transmission, the baseband processor 6-20 may generate complex symbols by encoding and modulating a transmission bit string, map the complex symbols to subcarriers, and then configure OFDM symbols through an IFFT operation and CP insertion.

Also, during data reception, the baseband processor 6-20 may divide the baseband signal provided from the RF processor 6-10 into OFDM symbol units, restore signals mapped to the subcarriers through an FFT operation, and then restore a reception bit string through demodulation and decoding. The baseband processor 6-20 and the RF processor 6-10 may transmit and receive signals as described above. Accordingly, the baseband processor 6-20 and the RF processor 6-10 may be referred to as a transmitter, a receiver, a transceiver, a communicator, or a wireless communicator. The base station may transmit/receive signals to/from the terminal by using the baseband processor 6-20 and the RF processor 6-10, and the signals may include control information and data.

The backhaul communicator 6-30 may provide an interface for communicating with other nodes in the network. That is, the backhaul communicator 6-30 may convert a bit string transmitted from the base station to another node, for example, an auxiliary base station, a core network, or the like, into a physical signal and may convert a physical signal received from another node into a bit string. The backhaul communicator 6-30 may be included in the communicator.

The storage 6-40 may store data such as a basic program, an application program, or configuration information for an operation of the base station. Particularly, the storage 6-40 may store information about a bearer allocated to a connected terminal, a measurement result reported from the connected terminal, or the like. Also, the storage 6-40 may store information that is a reference for determining whether to provide or terminate multiple connections to the terminal. Also, the storage 6-30 may provide the stored data at the request of the controller 6-50. The storage 6-40 may include a storage medium or a combination of storage media such as ROM, RAM, hard disk, CD-ROM, and DVD. Also, the storage 6-40 may include a plurality of memories.

The controller 6-50 may controls overall operations of the main base station. For example, the controller 6-50 may transmit/receive signals through the baseband processor 6-20 and the RF processor 6-10 or through the backhaul communicator 6-30. Also, the controller 6-50 may write/read data into/from the storage 6-40. For this purpose, the controller 6-50 may include at least one processor. According to an embodiment of the present disclosure, the controller 6-50 may include a multiple connection processor 6-52 configured to process a process operating in a multiple-connection mode. Also, at least one component in the terminal may be implemented as one chip.

According to an embodiment of the present disclosure, the controller 6-50 may control each component of the base station to perform a method of requesting system information for a position-based system according to an embodiment of the present disclosure. The method of requesting system information for a position-based system according to the present disclosure will be described below in detail with reference to FIG. 7.

Figure 7:
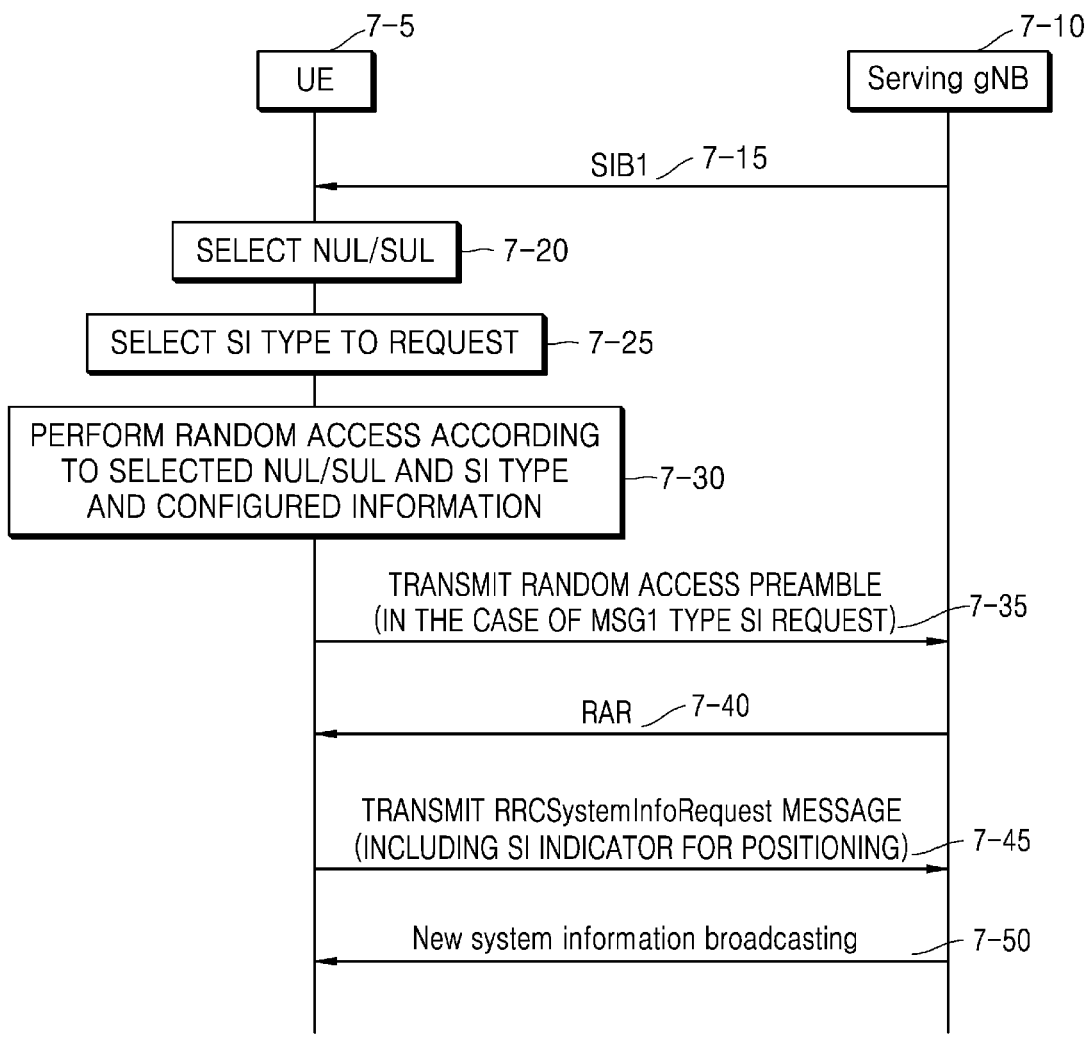
FIG. 7 is a diagram for describing operations of a terminal and a base station when having received a configuration for requesting system information for positioning from a serving base station, according to an embodiment of the present disclosure.

FIG. 7 is a diagram for describing operations of a terminal and a base station when having received a configuration for requesting system information for positioning from a serving base station, according to an embodiment of the present disclosure.

A terminal (user equipment (UE)) 7-5 may perform cell selection. The terminal 7-5 may receive system information such as SIB1 from a cell selected by performing cell selection or a serving base station 7-10 operating the selected cell (operation 7-15). The SIB1 may include configuration information for a system information request of normal system information. Also, the SIB1 may also include configuration information for a system information request for positioning. However, the present disclosure is not limited thereto.

According to an embodiment, the configuration information for requesting normal system information may be included and transmitted in SI-SchedulingInfo and in si-RequestConfig and si-RequestConfigSUL in the SIB1. Also, the configuration information for requesting system information for positioning may be provided as a field in the same phase as PosSI-SchedulingInfoList in the SIB1, may be provided as a field higher than the entry of a list in PosSI-SchedulingInfoList, or may be included in PosSI-SchedulingInfoList. However, the present disclosure is not limited thereto.

The terminal having obtained the configuration information for a system information (SI) request for positioning may initiate an SI request procedure for assistance information with respect to a positioning method currently required, being performed, or scheduled to be performed.

According to an embodiment of the present disclosure, the positioning method may be a position measurement (positioning) method. The position measurement method may include, for example, Time Of Arrival (TOA), Time Difference of Arrival (TDOA), Angle Of Arrival (AOA), Observed Time Difference Of Arrival (OTDOA), Received Signal Strength (RSS), and/or fingerprint method; however, the present disclosure is not limited thereto.

Also, according to an embodiment of the present disclosure, for the system information request for positioning, a process of determining whether to use a supplementary uplink (SUL) or whether to use a normal uplink (NUL)) may be required (operation 7-20).

According to an embodiment of the present disclosure, the terminal 7-5 may measure a currently-transmitted reference signal and may use a SUL carrier for random access when a measured Reference Signal Received Power (RSRP) value is less than a threshold value for use of the SUL. Accordingly, the terminal 7-5 may determine a PCMAX variable as a Pcmax f,c value of the SUL carrier.

When the measured RSRP value is greater than or equal to the threshold value, a normal UL carrier may be used for random access. In this case, the terminal 7-5 may determine a PCMAX variable as a Pcmax, f,c, value of the NUL carrier.

The terminal 7-5 may determine which system information message to request after the SUL/NUL selection process (operation 7-25). For example, the terminal 7-5 may determine whether a system information message to request is System Information Block 2 (SIB2) to SIB9 or posSIB.

Based on the determination result of operation 7-25, the terminal 7-5 may perform a random access procedure (operation 7-30). When performing the random access procedure, the terminal 7-5 may determine whether to transmit an SI request based on Msg 1 (Msg 1 based) or whether to transmit an SI request based on Msg 3 (Msg 3 based). Particularly, the terminal may determine a method of performing the random access procedure according to the following criteria. However, the present disclosure is not limited to the following example.

According to an embodiment of the present disclosure, transmitting the SI request based on the Msg 1 (Msg 1 based) may mean transmitting the SI request by using the Msg 1, and transmitting the SI request based on the Msg 3 (Msg 3 based) may mean transmitting the SI request by using the Msg 3.

When the SIB type of the normal system information message is desired, the terminal 7-5 may select one of an Msg 1 based SI request and an Msg 3 based SI request as follows.

The terminal 7-5 may select an Msg 1 based method when the terminal 7-5 has previously selected the NUL and si-RequestConfig is included in SI-SchedulingInfo in the received SIB1 and select an Msg 3 based method when not included, and may perform the random access procedure according to the selected method.

The terminal may select the Msg 1 based method when the terminal 7-5 has previously selected the SUL and si-RequestConfigSUL is included in SI-SchedulingInfo in the received SIB1 and select the Msg 3 based method when not included, and may perform the random access procedure according to the selected method.

When not the SIB type of the normal system information message but the positioning SIB type is desired, the terminal 7-5 may determine whether to transmit the SI request based on the Msg 1 (Msg 1 based) or whether to transmit the SI request based on the Msg 3 (Msg 3 based) when performing the random access procedure. Particularly, the terminal may determine the method of performing the random access procedure according to the following criteria. However, the present disclosure is not limited to the following example. The terminal 7-5 may select the Msg 1 based method when the terminal 7-5 has previously selected the NUL, posSI-RequestConfig is included in PosSI-SchedulingInfoList in the received SIB1, and an SUL indicator is not included therein, and may perform the random access procedure according to the selected method.

When posSI-RequestConfig is included in PosSI-SchedulingInfoList and the SUL indicator is included therein, the Msg 3 based method may be selected and the random access procedure may be performed according to the selected method.

When posSI-RequestConfig is not included in PosSI-SchedulingInfoList, the Msg 3 based method may be selected and the random access procedure may be performed according to the selected method.

The terminal 7-5 may select the Msg 3 based method when the terminal 7-5 has previously selected the SUL, posSI-RequestConfig is included in PosSI-SchedulingInfoList in the received SIB1, and the SUL indicator is not included therein and may perform the random access procedure according to the selected method.

When posSI-RequestConfig is included in PosSI-SchedulingInfoList and the SUL indicator is included therein, the Msg 1 based method may be selected and the random access procedure may be performed according to the selected method.

When posSI-RequestConfig is included in PosSI-SchedulingInfoList, the Msg 3 based method may be selected and the random access procedure may be performed according to the selected method.

When the MSG1 based method is selected, the terminal 7-5 may determine an SI-request resource to be used.

In the case of a normal system information request, the terminal 7-5 may consider the number of SI-RequestResources included in the si-RequestResources field and the type of SI to request, and for positioning purposes, the terminal 7-5 may consider the number of SI-RequestResources included in the si-RequestResource field in posSI-RequestConfig in PosSI-SchedulingInfoList and the type of SI to request to determine the resource to be used.

The terminal 7-5 may transmit a preamble by using the determined resource (operation 7-35).

When the MSG3 based method is selected, the terminal 7-5 write and transmit an RRCSystemInfoRequest msg. In this case, when it is the SI request for positioning, an indicator indicating the same may be included and transmitted in the message (operation 7-45).

Also, according to an embodiment of the present disclosure, information necessary for posSI-RequestConfig may be transmitted by another method in the process of determining random access (operation 7-30).

As in FIG. 7, the terminal may determine which one of NUL/SUL to use (operation 7-20) and may determine which method to use among the SI methods based on the configuration information of SI-RequestConfig, that is, the msg1 based method or the msg3 based method (Operation 7-30).

When posSI-RequestConfig is introduced in PosSI-SchedulingInfoList in the SIB1, the serving base station 7-10 may instruct the terminal to map the SUL/NUL by mapping posSI-RequestConfig and the SUL/NUL.

As the mapping method, an indicator indicating whether it is the SUL or the NUL may be added while using only one posSI-RequestConfig. (As another example, a predetermined indicator may be added only in the case of the SUL, and the NUL may be indicated when there is no predetermined indicator.)

In this case, when the terminal 7-5 receives the posSI-RequestConfig (through the SIB1) and an SUL indicator is included in the received posSI-RequestConfig, when it is determined that the SI requestConfig is configured for random access transmission on the SUL and it is determined to request the SI through the SUL, the SI request may be performed based on the msg 1 by using the SI requestConfig.

in another case, that is, when it has been previously determined to request the SI through the NUL, by determining that the SI requestConfig for the NUL does not exist, the terminal may perform the SI request based on the msg3 using the NUL.

When the terminal 7-5 receives posSI-RequestConfig and a NUL indicator is included in the received posSI-RequestConfig, when it is determined that the SI requestConfig is configured for random access transmission on the NUL and it is determined to request the SI through the NUL, the SI request may be performed based on the msg 1 by using the SI requestConfig.

in another case, that is, when it has been previously determined to request the SI through the SUL, by determining that the SI requestConfig for the SUL does not exist, the terminal may perform the SI request based on the msg3 using the SUL.

In another embodiment, the serving base station 7-10 may separately configure posSI-RequestConfig for the NUL and posSI-RequestConfig for the SUL. In this case, the serving base station 7-10 may separately notify each of the SI request method and the resource information to be used when using the NUL and the SUL. The terminal 7-5 may previously determine which one of the NUL/SUL to use before determining the SI request method. Based on the result of determining which one of the NUL/SUL to use, with reference to the posSI-RequestConfig field corresponding to the determined UL, the terminal 7-5 may determine the resource and configuration information and request the SI.

When the terminal 7-5 has determined to perform the request through the NUL in the previous operation, the terminal 7-5 may identify whether posSI-RequestConfig for NUL is included in the SIB1, when included, the terminal 7-5 may perform the SI request according to a given configuration based on the msg1 through the NUL, and when not included, the terminal 7-5 may perform the SI request based on the msg3 through the NUL.

When the terminal 7-5 has determined to perform the request through the SUL in the previous operation, the terminal 7-5 may identify whether posSI-RequestConfig for the SUL is included in the SIB, when included, the terminal 7-5 may perform the SI request according to a given configuration based on the msg1 through the SUL, and when not included, the terminal 7-5 may perform the SI request based on the msg3 through the SUL.

Also, according to an embodiment of the present disclosure, SI-RequestConfig for posSI and SI-RequestConfig for normal SI may be defined differently.

Among the subfields of SI-RequestConfig, in the case of rach-OccasionsSI, when rach-OccasionsSI is not included (absent) in a normal SI request, the terminal 7-5 may use the configuration of RACH-configCommon as it is. When rach-OccasionsSI is not included (absent) in a posSI request, the terminal 7-5 may use the configuration at the time of the normal SI request as it is.

Among the subfields of SI-RequestConfig, SI-RequestResources may be a field indicating radio resources that should be used to transmit the SI request. This field may be signaled in the form of a list of resources. In the case of this field, in a normal SI request, when only one entry exists on the SI-RequestResource list, one entry on the list may be used as a resource for those whose si-BroadcastStatus is notBroadcasting among all SI messages. Otherwise, the first entry of the list may be used as a resource for the first SI message of notBroadcasting among the SI messages in the schedulingInfoList, and the second entry may be used for the second SI message. A change in si-RequestResources may not result in a change in system information change notification.

In the case of si-RequestResources for posSi, when only one entry exists on the list, one entry on the list may be used as a resource for those whose si-BroadcastStatus is not-Broadcasting or unicasting among all SI messages. Otherwise, the first entry of the list may be used as a resource for the first SI message of notBroadcasting or unicasting among the posSI messages in the PosSi-schedulingInfoList, and the second entry may be used for the second posSI message. A change in si-RequestResources may not result in a change in system information change notification (If there is only one entry in the list, the configuration is used for all posSI messages for which posSI-BroadcastStatus is set to not-Broadcasting or unicasting. Otherwise the 1st entry in the list corresponds to the first posSI message in PosSI-SchedulingInfoList for which posSI-BroadcastStatus is set to notBroadcasting or unicasting, 2nd entry in the list corresponds to the second posSI message in PosSI-SchedulingInfoList for which posSI-BroadcastStatus is set to notBroadcasting or unicasting and so on. Change of si-RequestResources should not result in system information change notification).

According to an embodiment of the present disclosure, the serving base station 7-10 may broadcast new system information according to the request of the terminal 7-5 (operation 7-50). For example, when the terminal 7-5 requests the normal SI, the normal SI may be broadcast, and when the terminal 7-5 requests the pos SI, the pos SI may be broadcast.

According to an embodiment of the present disclosure, the following information may be transmitted as positioning assistance information provided by the request of the terminal 7-5.

CommonIEsProvideAssistanceData: Segmentation information of LPP (Location Positioning Protocol) message that transmits assistance information may be included.

A-GNSS-ProvideAssistanceData: Normal information required in a Global Navigation Satellite System (GNSS) scheme, information related to a particular GNSS, and periodic GNSS information may be included. For example, the normal information required in the GNSS scheme may include at least one of GNSS-ReferenceTime, GNSS-ReferenceLocation, GNSS-IonosphericModel, GNSS-EarthOrientationParameters, GNSS-RTK-ReferenceStationInfo, GNSS-RTK-CommonObservationInfo, GNSS-RTK-AuxiliaryStationData, and GNSS-SSR-CorrectionPoints, and the information related to the particular GNSS may include at least one of GNSS-ID, SBAS-ID, GNSS-TimeModelList, GNSS-DifferentialCorrections, GNSS-NavigationModel, GNSS-RealTimeIntegrity, GNSS-DataBitAssistance, GNSS-AcquisitionAssistance, GNSS-Almanac, GNSS-UTC-Model, GNSS-AuxiliaryInformation, BDS-DifferentialCorrections, BDS-GridModelParameter, GNSS-RTK-Observations, GLO-RTK-BiasInformation, GNSS-RTK-MAC-CorrectionDifferences, GNSS-RTK-Residuals, GNSS-RTK-FKP-Gradients, GNSS-SSR-OrbitCorrections, GNSS-SSR-ClockCorrections, GNSS-SSR-CodeBias, GNSS-SSR-URA, GNSS-SSR-PhaseBias, GNSS-SSR-STEC-Correction, GNSS-SSR-GriddedCorrection, NavIC-DifferentialCorrections, and NavIC-GridModelParameter.

OTDOA-ProvideAssistanceData: There are reference cell information and neighbor cell information as OTDOA-related assistance information, there are cellGlobalId, earfcnRef, antennaPortConfig, cpLength, prsInfo, tpId-r14, cpLengthCRS-r14, sameMBSFNconfigRef-r14, dlBandwidth-r14, addPRSconfigRef-r14, nr-LTE-SFN-Offset-r15, and tdd-config-v1520 as reference cell information, and the neighbor cell information may be basically transmitted by replacing the same type of information as the reference cell information with that of each neighbor cell.

Sensor-ProvideAssistanceData: Reference information related to sensor positioning may be included, and reference pressure, reference position, and temperature information may be included.

NR-Multi-RTT-ProvideAssistanceData: nr-DL-PRS-AssistanceData information and nr-SelectedDL-PRS-IndexList information may be included.

The nr-DL-PRS-AssistanceData information may be information about a positioning reference signal to be used for measurement in the downlink, and the id of a particular TRP and the resource id information of the DL PRS associated therewith, resource set id information, and information for each frequency layer of the above information and information for each TRP may be included.

The nr-SelectedDL-PRS-IndexList may provide the id of a DL PRS particularly selected by a Location Management Function (LMF) among the common PRSs as a list.

DL PRS assistance information may be used not only in multi-RTT but also in NR OTDOA, ECID (Enhanced Cell Identity), and AoD (Angle of Departure) methods.

NR-DL-AoD-ProvideAssistanceData: The nr DL PRS and selected DL PRS information may be included.

NR-DL-TDOA-ProvideAssistanceData: The nr DL PRS and selected DL PRS information may be included.

According to an embodiment of the present disclosure, the following information may be transmitted as positioning assistance information provided by the request of the terminal 7-5.

CommonIEsProvideAssistanceData: Segmentation information of LPP (Location Positioning Protocol) message that transmits assistance information may be included.

A-GNSS-ProvideAssistanceData: Normal information required in a Global Navigation Satellite System (GNSS) scheme, information related to a particular GNSS, and periodic GNSS information may be included. For example, the normal information required in the GNSS scheme may include at least one of GNSS-ReferenceTime, GNSS-ReferenceLocation, GNSS-IonosphericModel, GNSS-EarthOrientationParameters, GNSS-RTK-ReferenceStationInfo, GNSS-RTK-CommonObservationInfo, GNSS-RTK-AuxiliaryStationData, and GNSS-SSR-CorrectionPoints, and the information related to the particular GNSS may include at least one of GNSS-ID, SBAS-ID, GNSS-TimeModelList, GNSS-DifferentialCorrections, GNSS-NavigationModel, GNSS-RealTimeIntegrity, GNSS-DataBitAssistance, GNSS-AcquisitionAssistance, GNSS-Almanac, GNSS-UTC-Model, GNSS-AuxiliaryInformation, BDS-DifferentialCorrections, BDS-GridModelParameter, GNSS-RTK-Observations, GLO-RTK-BiasInformation, GNSS-RTK-MAC-CorrectionDifferences, GNSS-RTK-Residuals, GNSS-RTK-FKP-Gradients, GNSS-SSR-OrbitCorrections, GNSS-SSR-ClockCorrections, GNSS-SSR-CodeBias, GNSS-SSR-URA, GNSS-SSR-PhaseBias, GNSS-SSR-STEC-Correction, GNSS-SSR-GriddedCorrection, NavIC-DifferentialCorrections, and NavIC-GridModelParameter.

OTDOA-ProvideAssistanceData: There are reference cell information and neighbor cell information as OTDOA-related assistance information, there are cellGlobalId, earfcnRef, antennaPortConfig, cpLength, prsInfo, tpId-r14, cpLengthCRS-r14, sameMBSFNconfigRef-r14, dlBandwidth-r14, addPRSconfigRef-r14, nr-LTE-SFN-Offset-r15, and tdd-config-v1520 as reference cell information, and the neighbor cell information may be basically transmitted by replacing the same type of information as the reference cell information with that of each neighbor cell.

Sensor-ProvideAssistanceData: Reference information related to sensor positioning may be included, and reference pressure, reference position, and temperature information may be included.

NR-Multi-RTT-ProvideAssistanceData: nr-DL-PRS-AssistanceData information and nr-SelectedDL-PRS-IndexList information may be included.

The nr-DL-PRS-AssistanceData information may be information about a positioning reference signal to be used for measurement in the downlink, and the id of a particular TRP and the resource id information of the DL PRS associated therewith, resource set id information, and information for each frequency layer of the above information and information for each TRP may be included.

The nr-SelectedDL-PRS-IndexList may provide the id of a DL PRS particularly selected by a Location Management Function (LMF) among the common PRSs as a list.

DL PRS assistance information may be used not only in multi-RTT but also in NR OTDOA, ECID (Enhanced Cell Identity), and AoD (Angle of Departure) methods.

NR-DL-AoD-ProvideAssistanceData: The nr DL PRS and selected DL PRS information may be included.

NR-DL-TDOA-ProvideAssistanceData: The nr DL PRS and selected DL PRS information may be included.

The methods according to the embodiments of the present disclosure described in the specification or the claims may be implemented by hardware, software, or a combination thereof.

When the methods are implemented as software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the present disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory including any combination of some or all thereof. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing embodiments of the present disclosure. Also, a separate storage device on a communication network may be connected to an apparatus performing an embodiment of the present disclosure.

In the above particular embodiments of the present disclosure, the components included in the present disclosure are expressed in the singular or plural according to the presented particular embodiments of the present disclosure. However, the singular or plural expressions are selected suitably according to the presented situations for convenience of description, the present disclosure is not limited to the singular or plural components, and the components expressed in the plural may even be configured in the singular or the components expressed in the singular may even be configured in the plural.

It should be understood that the embodiments of the present disclosure described herein should be considered in a descriptive sense only and not for purposes of limitation. That is, it will be understood by those of ordinary skill in the art that various changes in form and details may be made in the embodiments of the present disclosure without departing from the scope of the present disclosure. Also, the embodiments of the present disclosure may be operated in combination when necessary. For example, the base station and the terminal may be operated according to a combination of portions of an embodiment and another embodiment of the present disclosure. Also, embodiments of the present disclosure may also be applied to other communication systems, and other modifications based on the technical spirit of the embodiments may also be implemented.

The invention claimed is:

1. A method, performed by a terminal, of requesting positioning system information, the method comprising:
  receiving system information block 1 (SIB1) from a base station;
  selecting a supplementary uplink (SUL) or a normal uplink (NUL) based on a reference signal received power (RSRP) threshold condition;
  in case that the SIB1 includes first configuration information for requesting the positioning system information on the SUL and the SUL is selected, selecting a transmission method based on Msg 1;
  in case that the SIB1 includes second configuration information for requesting the positioning system information on the NUL and the NUL is selected, selecting the transmission method based on Msg 1;
  in case that the SIB1 does not include the first configuration information and the SUL is selected or in case that the SIB1 does not include the second configuration information and the NUL is selected, selecting a transmission method based on Msg 3; and
  transmitting a message for requesting the positioning system information, based on the selected uplink and the selected transmission method.

2. The method of claim 1, wherein the transmitting comprises, in case that the transmission method based on Msg 1 is selected, transmitting the message based on a resource and a preamble determined based on the first configuration information or the second configuration information.

3. The method of claim 1, wherein, in case that the transmission method based on Msg 3 is selected, the message includes an indicator indicating the message for requesting the positioning system information.

4. The method of claim 1, wherein, in case that the SUL is selected, the terminal transmits the message for requesting the positioning system information by using a power control parameter of the SUL, and wherein, in case that the NUL is selected, the terminal transmits the message for requesting the positioning system information by using a power control parameter of the NUL.

5. The method of claim 1, wherein the configuration information for requesting the positioning system information is included in PosSI-SchedulingInfoList in the SIB1.

6. The method of claim 1, wherein the SIB1 further includes configuration information for requesting normal system information, and
the transmitting comprises, when a rach-OccasionsSI field is not included in the configuration information for requesting the positioning system information, transmitting the message for requesting the positioning system information based on the configuration information for requesting the normal system information.

7. A terminal for requesting positioning system information, the terminal comprising:
a transceiver; and
a controller coupled with the transceiver and configured to:
receive system information block 1 (SIB1) from a base station,
select a supplementary uplink (SUL) or a normal uplink (NUL) based on a reference signal received power (RSRP) threshold condition,
in case that the SIB1 includes first configuration information for requesting the positioning system information on the SUL and the SUL is selected, select a transmission method based on Msg 1,
in case that the SIB1 includes second configuration information for requesting the positioning system information on the NUL and the NUL is selected, select the transmission method based on Msg 1,
in case that the SIB1 does not include the first configuration information and the SUL is selected or in case that the SIB1 does not include the second configuration information and the NUL is selected, select a transmission method based on Msg 3, and
transmit a message for requesting the positioning system information, based on the selected uplink and the selected transmission method.

8. The terminal of claim 7, wherein, in case that the transmission method based on Msg 3 is selected, the message includes an indicator indicating the message for requesting the positioning system information.

9. The terminal of claim 7, wherein the controller is configured to, in case that the transmission method based on Msg 1 is selected, transmit the message based on a resource and a preamble determined based on the first configuration information or the second configuration information.

10. The terminal of claim 7, wherein, in case that the SUL is selected, the terminal transmits the message for requesting the positioning system information by using a power control parameter of the SUL, and
wherein, in case that the NUL is selected, the terminal transmits the message for requesting the positioning system information by using a power control parameter of the NUL.

* * * * *